(12) United States Patent
Connell

(10) Patent No.: US 11,744,002 B2
(45) Date of Patent: Aug. 29, 2023

(54) SYSTEM OF CONVERGING PLASMA PISTONS

(71) Applicant: University of New Hampshire, Durham, NH (US)

(72) Inventor: James J. Connell, Durham, NH (US)

(73) Assignee: University of New Hampshire, Durham, NH (US)

( * ) Notice: Subject to any disclaimer, the term of this patent is extended or adjusted under 35 U.S.C. 154(b) by 242 days.

(21) Appl. No.: 16/645,066

(22) PCT Filed: Sep. 11, 2018

(86) PCT No.: PCT/US2018/050431
§ 371 (c)(1),
(2) Date: Mar. 6, 2020

(87) PCT Pub. No.: WO2019/055400
PCT Pub. Date: Mar. 21, 2019

(65) Prior Publication Data
US 2021/0029812 A1   Jan. 28, 2021

Related U.S. Application Data

(60) Provisional application No. 62/557,630, filed on Sep. 12, 2017.

(51) Int. Cl.
*H05H 1/14* (2006.01)
*H05H 1/16* (2006.01)
(Continued)

(52) U.S. Cl.
CPC ............... *H05H 1/14* (2013.01); *G21B 1/052* (2013.01); *G21B 1/15* (2013.01); *G21B 3/008* (2013.01); *H05H 1/06* (2013.01); *H05H 1/16* (2013.01)

(58) Field of Classification Search
CPC .. H05H 1/14; H05H 1/16; H05H 1/03; H05H 1/11; H05H 1/06; H05H 1/02; H05H 1/04;
(Continued)

(56) References Cited

U.S. PATENT DOCUMENTS 3,005,767 A   10/1961  Boyer et al.
3,655,508 A   4/1972   Hirsch
(Continued)

FOREIGN PATENT DOCUMENTS

WO   WO-0139197 A2 *  5/2001  ............... G21B 3/00
WO   2017083796 A1    5/2017

OTHER PUBLICATIONS

Lapointe, M. R., et al. Gradient Field Imploding Liner Fusion Propulsion System: NASA. Apr. 6, 2017. Downloaded from URL: . https://www.nasa.gov/directorates/spacetech/niac/2017_Phase_I_Phase_II/Gradient_Field_Imploding_Liner_Fusion_Propulsion_System/ (Year: 2017).*
(Continued)

*Primary Examiner* — Darlene M Ritchie
(74) *Attorney, Agent, or Firm* — Hamilton, Brook, Smith & Reynolds, P.C.

(57) ABSTRACT

A magnetic confinement system includes a magnetic mirror device that includes a chamber to hold a target plasma and a coil arrangement to generate a magnetic field configuration in the chamber to confine the target plasma in cylindrically-symmetric form in the chamber, the magnetic field configuration having open ends. The magnetic confinement system further includes plasma guns to generate plasma pistons and project the plasma pistons at the open ends of the magnetic field configuration. In operation, the plasma pistons con-
(Continued)

verge towards each other to close the open ends of the magnetic field configuration and to compress and heat the target plasma.

27 Claims, 7 Drawing Sheets

(51) Int. Cl.
    *G21B 1/15*         (2006.01)
    *G21B 1/05*         (2006.01)
    *H05H 1/06*        (2006.01)
    *G21B 3/00*         (2006.01)

(58) Field of Classification Search
    CPC . H05H 1/10; G21B 1/052; G21B 1/15; G21B 1/05; G21B 3/008
    USPC ................ 376/107, 121, 125, 139, 140, 149
    See application file for complete search history.

(56) References Cited

U.S. PATENT DOCUMENTS

| | | | |
|---|---|---|---|
| 4,269,658 A | | 5/1981 | Ohkawa |
| 4,314,879 A | | 2/1982 | Hailman et al. |
| 5,003,225 A | * | 3/1991 | Dandl .................. H01J 25/005 |
| | | | 315/111.41 |
| 9,659,736 B2 | * | 5/2017 | Rosenthal ............... H01J 37/08 |
| 11,049,620 B2 | * | 6/2021 | Slough ..................... H05H 1/02 |
| 2015/0364220 A1 | * | 12/2015 | Slough ................... B64G 1/422 |
| | | | 376/125 |
| 2017/0323691 A1 | * | 11/2017 | Gorski ..................... G21B 1/15 |
| 2019/0141827 A1 | * | 5/2019 | Gonzalez ................. H05H 1/54 |
| 2021/0110939 A1 | * | 4/2021 | Binderbauer ............ H05H 1/54 |

OTHER PUBLICATIONS (Dec. 14, 2022), "National Ignition Facility achieves fusion ignition", Lawrence Livermore National Laboratory, https://www.llnl.gov/news/national-ignition-facility-achieves-fusion-ignition. (Year: 2022).*
Dylla, H. Frederick. "How Long is the Fuse on Fusion?." Scientific Journeys. Springer, Cham, 2020. 83-88. (Year: 2020).*
What will ITER do? iter.org/sci/Goals, downloaded Dec. 30, 2022. (Year: 2022).*
International Search Report for International Application No. PCT/US2018/050431, entitled "System of Converging Plasma Pistons," dated Nov. 19, 2018.
Written Opinion for International Application No. PCT/US2018/050431, entitled "System of Converging Plasma Pistons," dated Nov. 19, 2018.
Hsu, et al., "Plasma Guns Fire Into the Race for Fusion," Scientia, Copyright HyperV Technologies Corp. 2016, pp. 1-3, www.scientiapublications.com.
Hsu, et al., "Spherically Imploding Plasma Liners as a Standoff Driver for Magnetoinertial Fusion," IEEE Transactions on Plasma Science, vol. 40, No. 5, pp. 1287-1298, May 2012.
Witherspoon, et al., "MiniRailgun Accelerator for Plasma Liner Driven HEDPand Magneto-Inertial Fusion Experiments," 36th ICOPS Meeting, San Diego, CA, Jun. 1, 2009, 21 pages.
Witherspoon, et al., "A Contoured Gap Coaxial Plasma Gun with Injected Plasma Armature," Review of Scientific Instruments 80, 083506, pp. 1-15, published Aug. 27, 2009.
Huba, "Thermonuclear Fusion," 2016 NRL Plasma Formulary.
TMX Group, T.C. Simonen, Editor, "Summary of Results from the Tandem Mirror Experiment (TMX)," Feb. 26, 1981, UCRL-53120, Lawrence Livermore Laboratory, University of California, Livermore, California.
Miyoshi, "Contribution on tandem mirrors at the University of Tsukuba (GAMMA 6 and GAMMA 10)," 1985 Nucl. Fusion, vol. 25, No. 9, 1985, pp. 1201-1203.
Kawabe, et al., "11.10.3. Open-Ended Fusion Devices and Reactors," Journal of Fusion Energy, vol. 3, Nos. 5/6, 1983.
Witherspoon, et al., "A contoured gap coaxial plasma gun with injected plasma armature," Review of Scientific Instruments 80, 083506 (2009).
International Preliminary Report on Patentability for International Application No. PCT/2018/050431, entitled, "System of Converging Plasma Pistons," dated Mar. 17, 2020,

* cited by examiner

US 11,744,002 B2

SYSTEM OF CONVERGING PLASMA PISTONS

RELATED APPLICATIONS

This application is the U.S. National Stage of International Application No. PCT/US2018/050431, filed Sep. 11, 2018, which designates the U.S., published in English, which claims the benefit of U.S. Provisional Application No. 62/557,630, filed on Sep. 12, 2017. The entire teachings of the above applications are incorporated herein by reference.

BACKGROUND

Laboratory plasma machines since the end of the Second World War have largely been directed towards developing controlled nuclear fusion using magnetic confinement. This is not to say all such machines were purely for applied research. Some machines were intended for basic plasma research into such aspects as plasma stability, magnetic reconnection, etc. In some cases, this research had implications to other branches of science such as astrophysical and space plasmas. Magnetic Confinement Fusion (MCF), however, was and is a driving goal. In the 1950's, it was widely assumed controlled nuclear fusion would be relatively easily achieved. Over a half-century of endeavor has instead exposed successive difficulties, many related to plasma instabilities and confinement.

In a fusion reaction, two lighter atomic nuclei fuse to form a heavier nucleus. This process occurs in stars, where it produces energy and heavier elements. In stars, gravity provides confinement of the fuel while the reaction takes place. In man-made fusion, the reaction normally takes place in a plasma of deuterium and tritium heated to millions of degrees. At such temperatures, there are two approaches to confining the plasma. The first approach is inertial confinement, thermonuclear weapons being a working example, but research is also being done on a smaller scale for controlled fusion. The second approach is confinement by electric or magnetic fields. Designing a system that can confine the plasma long enough at high enough temperature and density is the major challenge in the development of fusion power.

SUMMARY

A magnetic confinement system includes a magnetic mirror device that includes a chamber to hold a target plasma and a coil arrangement to generate a magnetic field configuration in the chamber to confine the target plasma in cylindrically-symmetric form in the chamber, the magnetic field configuration having open ends. The magnetic confinement system further includes plasma guns or similar devices to generate plasma pistons and project the plasma pistons at the open ends of the magnetic field configuration. In operation, the plasma pistons converge towards each other to close the open ends of the magnetic field configuration and to compress and heat the target plasma.

The coil arrangement can include plural coils arranged along a length of the chamber, the plural coils generating a longitudinal magnetic field to confine the target plasma radially, where the magnetic field is strengthened at the ends of the magnetic field configuration to form magnetic mirrors.

In an embodiment, the target plasma is confined in a field-reversed configuration. In another embodiment, the target plasma is confined in a spheromak. (Note, these are closed magnetic configurations, often classed as "compact tori," but they are often formed, and held within, open magnetic field machines, which can lead to confusion in terminology.)

The chamber can be configured according to the requirements of a particular application. For example, the shape of the chamber is typically determined by what the chamber needs to contain and that it has to, at times, hold a vacuum. Conductivity in the chamber walls, or in liners, may be used to aid plasma stability. The chamber can be cylindrical. Each of the plasma guns can be configured to project one of the plasma pistons at one of the open ends of the magnetic field configuration. In an embodiment, the plasma guns are linear railguns and the chamber is non-cylindrical to accommodate the railguns. In another embodiment, the plasma guns are coaxial railguns. There may also be a number of railguns working in concert.

The system can further include a mechanism to further compress the target plasma radially. In an embodiment, the mechanism is configured to increase the magnetic field at a certain region (e.g., center region) of the magnetic field configuration to compress the target plasma radially (e.g., "pinch" the target plasma). Alternatively, or in addition, the mechanism can include a liner within the chamber, the liner configured to implode to compress the target plasma radially.

Mass and velocity of each plasma piston can be selected to result in sufficient compression and heating of the target plasma to produce thermonuclear fusion. The target plasma can include primarily thermonuclear fuel, such as deuterium ($^2$H) and tritium ($^3$H) or helium-3 ($^3$He). Various fuels are theoretically possible. Deuterium-tritium (D-T) has the highest reaction rate at the lowest temperature $\langle\langle\sigma v\rangle\rangle$. Deuterium-deuterium (D-D) has the advantage that it is not necessary to "breed" fuel. Deuterium-helium-3 (D-$^3$He) has the advantage that the number of neutrons produced is very low, but it raises the Coulomb barrier and providing sufficient quantities of $^3$He may be difficult. There are other fuels that have been theoretically studied (e.g., $^1$H and $^{11}$B as another aneutronic fuel). The target plasma can further include heavy ions to cool electrons via bremsstrahlung, reducing their contribution to the pressure in non-equilibrium condition.

"Breeding" within the context of nuclear physics is transmuting one (usually more abundant) nuclide into another (less abundant) nuclide for fuel or weapons materials. A well-known example is taking "fertile" U-238 and exposing it to neutrons in a reactor. The U-239 beta-decays into fissile Pu-239 that can be used as fuel in reactors or for nuclear weapons. Pu-239 is not found naturally on Earth (its half-life is about 24,000 years, far shorter than the age of the Earth). A "breeder reactor" produces more fissile fuel (U-233 or Pu-239) from fertile nuclides (Th-232 or U-238) than it consumes.

Similarly, T, with a half-life of 12.3 years, is rare in nature (it is produced in very dilute amounts by cosmic rays and is also a product of nuclear reactors, often released as waste.) For a D-T fusion reactor, the assumption is that the reactor is surrounded by a lithium breading blanket. Neutrons from fusion are absorbed in the lithium. The lithium gets hot, to produce power via gas or steam turbines, but also breeds T. (Both isotopes of lithium can produce T when exposed to fusion neutrons.) The tritium can be extracted from the blanket and used with D (extracted from water) to continue to fuel the reactor.

The system can be configured such that the target plasma, when compressed, has a high β, of order unity, where β is the ratio of pressure of the plasma and magnetic pressure due to the magnetic field. High-$\beta$ machines contrast with low-$\beta$ machines, such as tokamaks, where $\beta$ is typically on the order of a few percent.

Each plasma piston can include a series of plasma pistons.

Each plasma piston can include primarily a composition of material different from that of the target plasma. For example, each plasma piston can include primarily a noble gas, such as Xenon. Alternatively, each plasma piston can include primarily thermonuclear fuel. The piston can include any suitable material. A carbon foil is a commonly used approach for a plasma railgun. If a heavy gas is desired, Xenon makes sense economically and in that it can easily be evacuated from the chamber. The use of something other than fuel can depend upon how much mixing occurs.

The system can further include means to hold the plasma pistons in position after compression of the target plasma. This can be an extension of the railguns that generate the plasma pistons. This can be magnetic fields generated by external coils which may also serve to confine or hold the target plasma, the relative currents in the coils being adjusted to accommodate the pistons. The process can also be used to move the pistons and to adjust for plasma loses in the pistons or the target plasma.

A structure, e.g., a central conductor, can be provided that extends through the chamber between two of the plasma guns to stabilize the plasma pistons. The central conductor can be configured to further stabilize the plasma pistons, the target plasma, or both, by application of a current through the central conductor. The central conductor can be a common central electrode of two plasma guns. The plasma pistons can be generated by passing a current from a shell electrode of one plasma gun through one of the plasma pistons and via the central electrode through another of the plasma pistons to a shell electrode of the other plasma gun.

A method for magnetic confinement of a plasma includes confining a target plasma with a magnetic mirror device, the magnetic mirror device including a chamber and a coil arrangement, the chamber holding the target plasma, the coil arrangement generating a magnetic field configuration in the chamber to confine the target plasma in cylindrically-symmetric form in the chamber, the magnetic field configuration having open ends; and converging plasma pistons towards each other to close the open ends of the magnetic field configuration and to compress and heat the target plasma.

Embodiments of the system and method described herein are useful for nuclear fusion, neutron production, and particle accelerator applications.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

Figure 1:
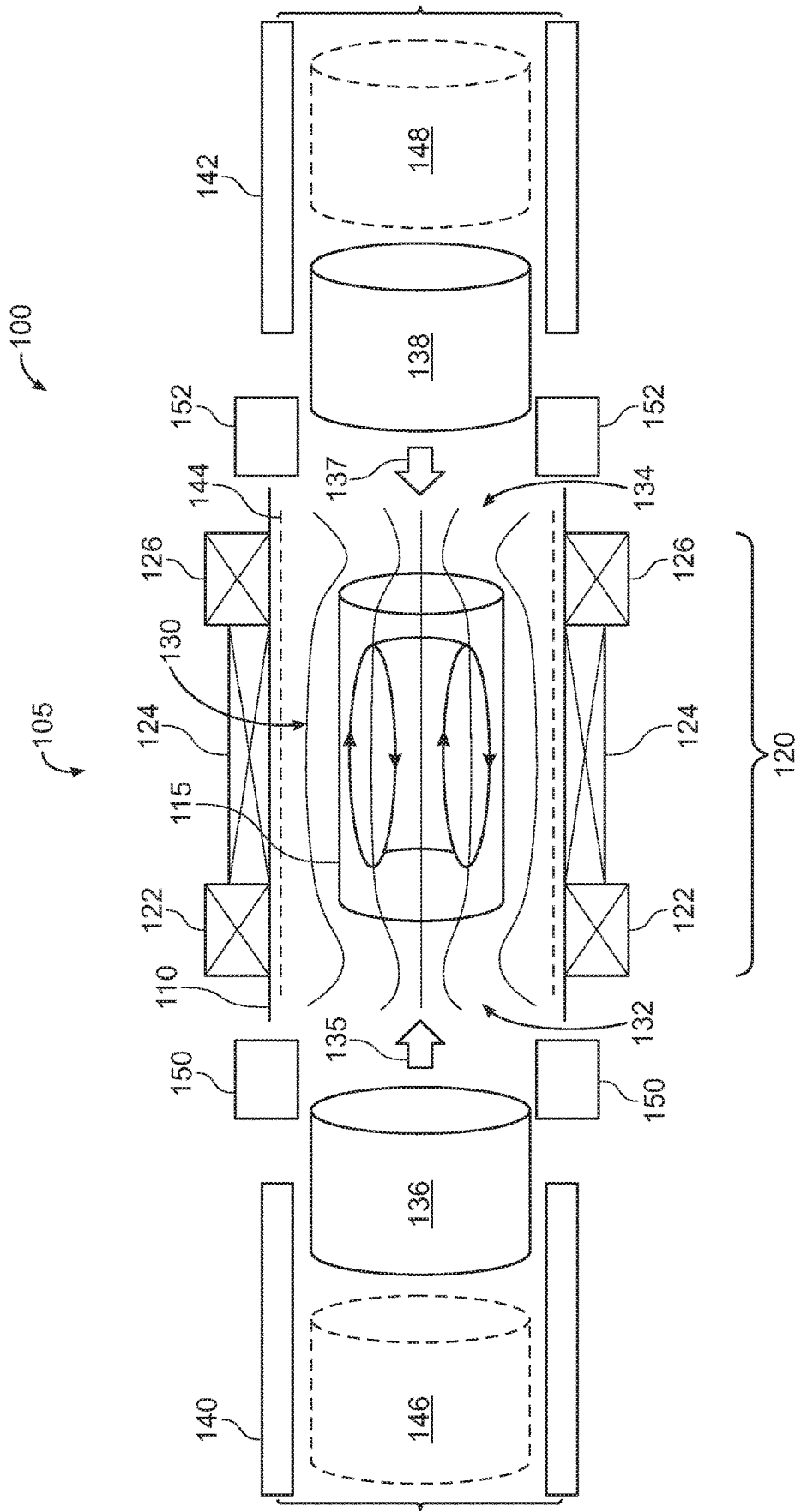
FIG. 1 is a schematic diagram illustrating a magnetic confinement system according to an example embodiment of the invention.

A description of example embodiments follows.

Introduction

The primary challenge of nuclear fusion is the Coulomb barrier between the light nuclei fuel (usually assumed to be isotopes of hydrogen, with deuterium, symbolized D, d, or $^2$H, and tritium, symbolized T, t or $^3$H, considered the most promising) arising from the two positively charged nuclei repelling each other. This is in direct contradiction to nuclear fission, where a chain reaction is attained and sustained via uncharged neutrons. Fundamentally, the electromagnetic Coulomb force is long ranged and must be overcome to get two nuclei close enough that the short-ranged nuclear forces can fuse them into a heavier nucleus and other products (e.g., neutrons) with a release of nuclear energy. The Coulomb barrier is often expressed as a kinetic energy or corresponding temperature or velocity.

In stars, fusion is achieved though temperature and pressure provided by gravitation and the mass of the star overlying the core. Indeed, most stars are supported against gravitational collapse by the outflow of energy produced in their cores. (White dwarfs and neutron stars being exceptions; they are supported by electron or neutron quantum degeneracy respectively.) In main-sequence stars, which burn $^1$H into $^4$He, the core temperatures (~16 MK, or ~1.4 keV in the case of the Sun) are typical well below the Coulomb barrier. Fusion is possible because of quantum mechanical tunneling through the Coulomb barrier. The probability of tunneling, to first order, increases exponentially with collisional energy. Tunneling probability, convoluted with the Boltzmann thermal distribution of the core plasma and the nuclear cross-section, accounts for the energy production. This convolution means that the bulk of the energy production comes from nuclei on the high-energy tail of the Boltzmann distribution. Ultimately, the Coulomb barrier is overcome by temperature, hence the origin of the term thermonuclear.

For a practical man-made nuclear fusion reactor, the nuclear energy produced must exceed the energy required to create the conditions that result in nuclear fusion. The point of equality is often termed the break-even point. For Magnetic Confinement Fusion (MCF), the Lawson criterion is a standard expression of this obvious principal. A number of assumptions, not always stated, are inherent in the Lawson criterion. The two most pertinent to this work is that the ions and electrons are in thermal equilibrium, and that the temperature is isotropic (this is not always the case in a magnetic plasma where the magnetic field direction breaks symmetry). The result is that both ions and electrons follow a Boltzmann distribution and the same temperature applies to both. Thermal losses, due mainly to radiation by electrons, then relate directly to the ion temperatures, which determine the fusion rate. It should be noted that these assumptions are manifestly false in many circumstances for space and astrophysical plasmas.

The energy density (work per volume) invested in bringing the plasma to a given temperature is just $$W = \tfrac{3}{2}(n_e k T_e + n_i T_i)$$

where $n_e$ and $n_i$ are the number densities of electrons and ions respectively (equal, for a quasi-neutral hydrogen plasma) and $T_e$ and $T_i$ are the respective temperatures (equal for the assumed thermal equilibrium). Of course, this is the work required, and ignores any inefficacies in the process, which are often substantial. Once assembled, the plasma loses energy. The dominant source of energy loss is normally assumed to be electron bremsstrahlung with power losses scaling as $\sim n_e^2 T^{1/2}$. For pulsed systems, the work is usually the dominant term. For magnetic confinement fusion, there is also the energy invested in producing the magnetic field.

The power produced using a reaction with a single fuel (e.g. D-D) is $$P = \tfrac{1}{2} n_i^2 \langle \sigma v \rangle E_y$$

where $\sigma$ (actually, the function $\sigma(v)$) is the nuclear fusion cross-section, $v$ is the collisional velocity and $E_y$ is the average energy yield of the reaction (3.65 MeV for D-D). In the case of two fuels (here taken as D-T, but other options exist) the corresponding equation is $$P = n_D n_T \langle \sigma v \rangle E_y = \tfrac{1}{4} n_i^2 \langle \sigma v \rangle E_y.$$

The last assumes an equal mix of the two fuels. (For D-T, the yield is 17.6 MeV.) The energy output is determined by some time, $\tau$ (e.g., the pulse time, energy confinement time, reaction time). So, for a pulsed system $$P\tau > W.$$

If, as Lawson assumed, the plasma is in thermal equilibrium, the term $\langle \sigma v \rangle$ is the average over the Boltzmann distribution of the isotropic velocity distribution. The Lawson criteria also takes into account the efficiency of converting thermal energy from the nuclear reaction(s) into electrical energy.

With reasonable power conversion efficiencies, the Lawson criterion for D-D is often given as temperatures of ~100 keV with $n_i \tau > 10^{22}$ m$^{-3}$s. The corresponding numbers for D-T are ~30 keV and $n_i \tau > 10^{20}$ m$^{-3}$s, which is the reason D-T is considered the more promising fuel cycle. (Present and planned tokamak designs use lower temperatures.) It is worth noting that much of the work put into the plasma is recovered as heat. That is turned into electrical power, but at a modest efficiency (~30%). Energy in the magnetic fields can be recovered much more efficiently.

Figure 2:
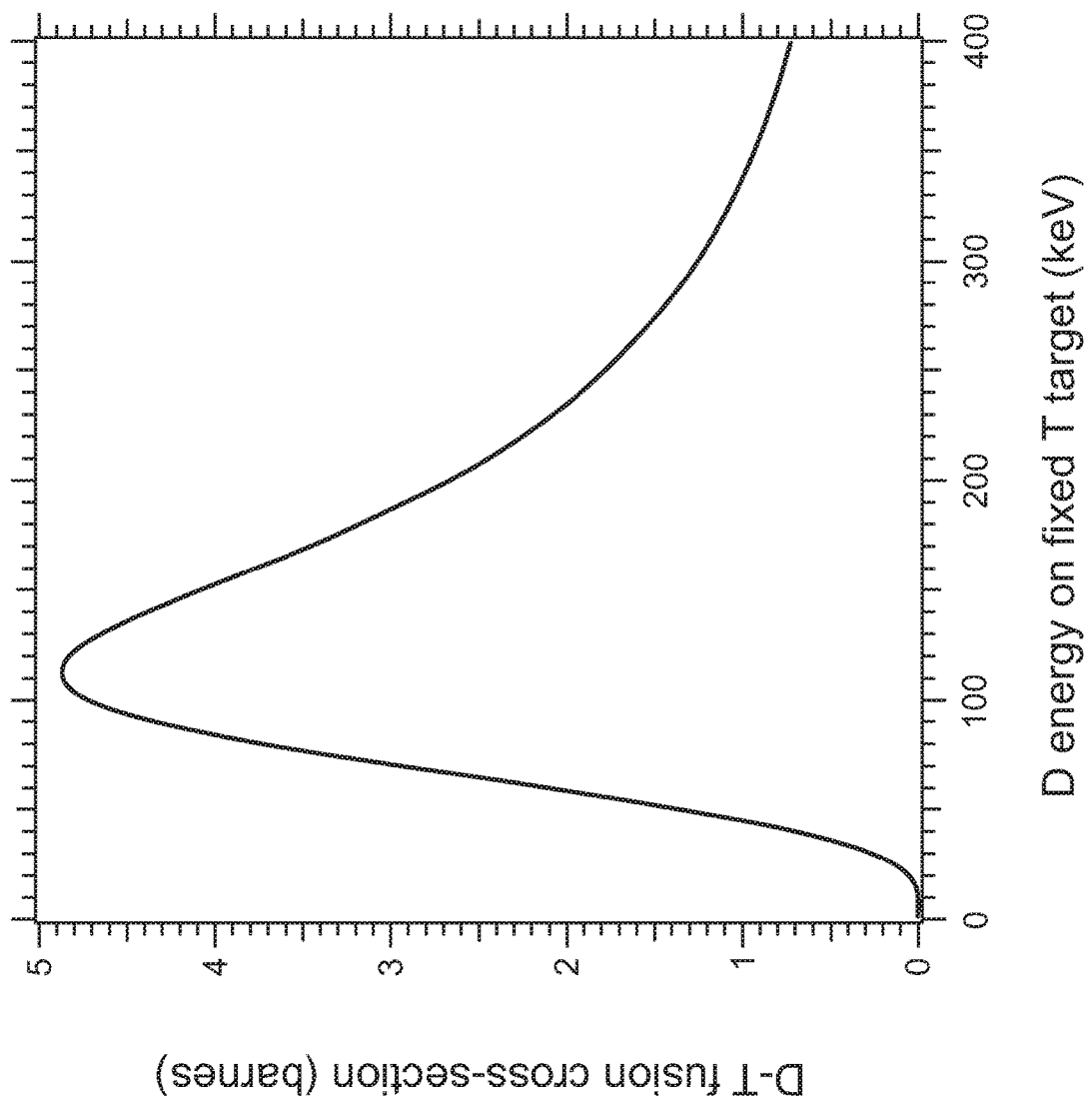
FIG. 2 is a plot of a mathematical expression of D-T nuclear fusion cross section a illustrating a peak in the nuclear fusion cross section at a temperature of about 115 keV.

It should be noted that these temperatures are well below the peaks of the nuclear cross-sections, $\sigma$. The peak for D-T is ~115 keV, and the cross-section is still rising rapidly at 30 keV, as illustrated in FIG. 2. Thus, ions in the high-energy tail of the Boltzmann distribution are the predominant reactants.

An often-useful distinction is between "steady-state" (often, quasi-steady-state) and pulsed machines. For typical quasi-steady-state machines, $n_i \sim 10^{20}$ m$^{-3}$s and $\tau \sim 1$ s. For typical pulsed machines, $n_i \sim 10^{23}$ m$^{-3}$ and $\tau \sim 1$ ms. It should be emphasized that these values can easily vary by an order of magnitude. It should also be emphasized that the plasma in a pulsed system is often not in strict thermal equilibrium. This also applies to some steady-state machines, including simple mirror machines as discussed below.

A numerical analysis of nuclear fusion was conducted. For the D-T nuclear fusion cross section, the analysis used a semi-empirical formulation from the "THERMO-NUCLEAR FUSION" section of the 2016 *NRL Plasma Formulary*, J. D, Huba (Beam Physics Branch, Plasma Physics Division, Naval Research Laboratory, Washington, D.C. 20375).

FIG. 2 is a plot of a mathematical expression for nuclear fusion cross section, which is a semi-empirical fit to actual measurements according to the 2016 *NRL Plasma Formulary*. The plot shows D-T fusion cross section (measured in barnes) as a function of D energy on fixed T target (measured in keV). The plot shows a peak in the nuclear fusion cross section ($\sigma$) at a temperature of about 115 keV.

Figure 3:
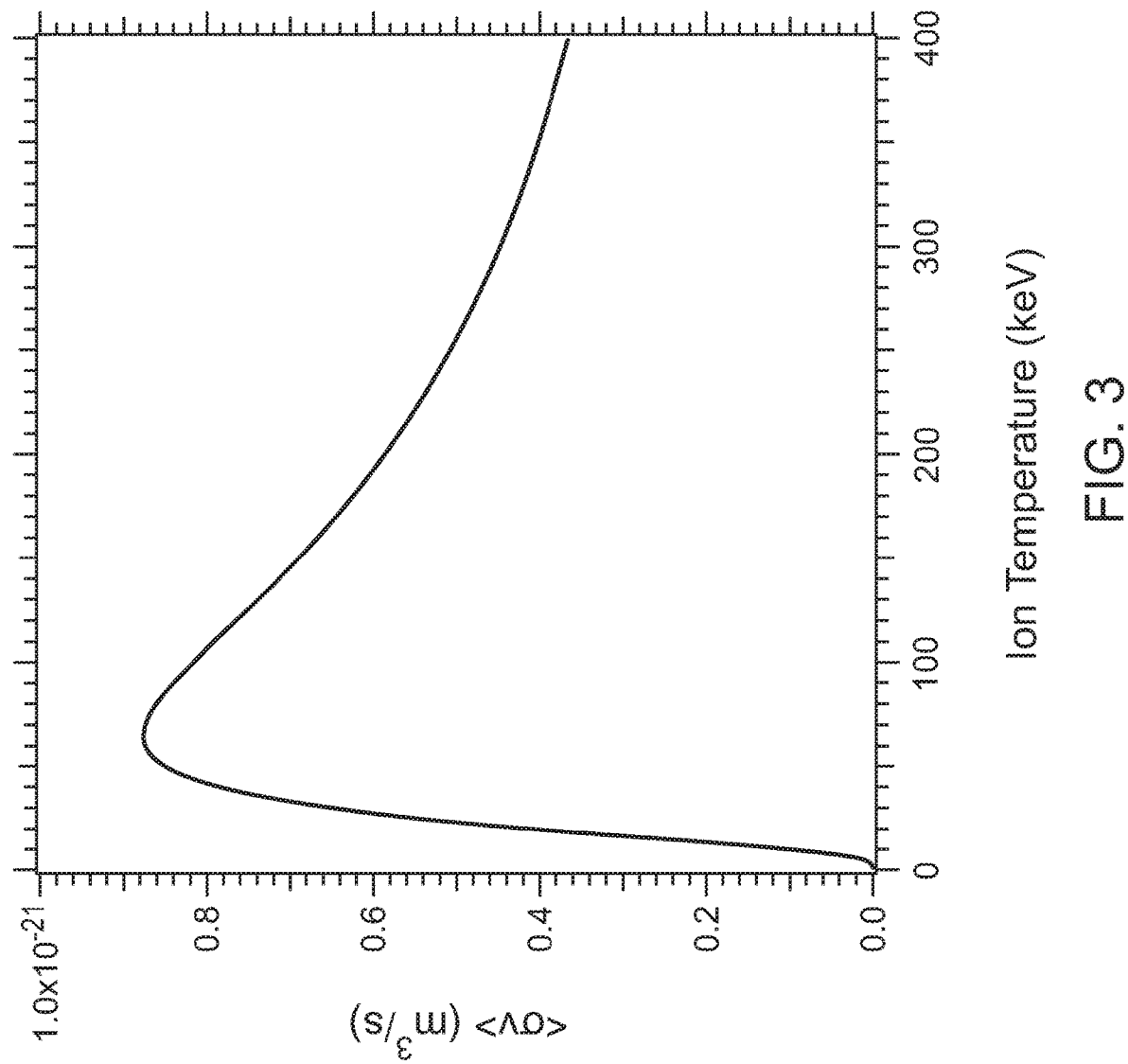
FIG. 3 is a plot illustrating a peak in the D-T quantity $<\sigma v>$ at a temperature of about 65 keV.

The crucial quantity $\langle \sigma v \rangle$ is obtained from the integration of the three-dimensional Boltzmann velocity distribution for the reactants (e.g., D and T, or D and D) nuclei. The resultant six-fold integral is normally evaluated numerically. The cross-section, $\sigma(v)$, is for a moving nucleus on a fixed target. Naturally, the peak, with both nuclei in motion, is at lower energy: the peak of $\langle \sigma v \rangle$ for D-T is ~65 keV. FIG. 3 is a plot of results of the numerical six-fold integration over the Boltzmann velocity distribution with the cross-section plotted in FIG. 2. FIG. 3 shows the peak in the quantity $\langle \sigma v \rangle$ (measure in m$^3$/s) at an ion temperature of about 65 keV.

Ideally, in a steady-state machine, the fusion plasma should reach and exceed ignition, where the fusion energy remaining in the plasma maintains the plasma temperature. In the case of D-T fusion, the reaction products are mainly $^4$He and neutrons; the charged $^4$He ions are largely trapped in the plasma, helping to sustain the temperature, while the uncharged neutrons escape. (This is provided the radius of the plasma is significantly larger than the gyro-radius of the energetic $^4$He in the magnetic field.)

To provide approximate numbers, for a plasma temperature of ~12 keV, a magnetic field of 10 T with a $\beta \sim 1$ limit, gives an ion number density of ~$1.0 \times 10^{22}$ m$^{-3}$. For D-T fusion, these conditions meet the Lawson criteria for a pulsed machine with a $\tau > 25$ ms. A significantly longer time would likely be required for a practical fusion reactor given inevitable losses and more realistic efficiencies.

One source, often dominant, of energy loss is radiation losses by electrons in the plasma. This loss increases with the plasma number density squared. The fusion rate also increases with the ion number density squared. This means that, for non-pulsed systems where this energy loss is important, scaling up the size of the reaction volume has little impact on achieving break-even or ignition as the power generation and power losses scale together. This scaling problem is often cited as a major physics barrier to practical nuclear fusion.

Overview of Magnetic Confinement Machines

The simplest early concept for a MCF machine was the "magnetic bottle." The more general embodiment is the magnetic mirror machine. These machines are typically cylindrical with a longitudinal magnetic field produced by external coils. The longitudinal field confined the plasma radially. The field was strengthened at both ends, creating a "magnetic mirror" which reflected most electrons and ions back into the confinement region. Once the plasma is established in the magnetic mirror machine, it may be heated by a variety of means (e.g., electron or ion resonance heating, neutral beam heating).

Magnetic mirrors are imperfect, resulting in a phase-space "lose cone" that depends mainly upon pitch angle (the angle of the particle velocity relative to the magnetic field) and the mirror ratio (how much the field strengthens at the mirror relative to the base field, typically at the center of the confinement region). Ions or electrons within the loss cone escape; thus, the plasma velocity distribution is anisotropic. The over-all loss rate depends upon particles scattering into the loss cone. As electrons scatter more rapidly than ions (see below), electrons are lost more rapidly, resulting in a charge imbalance. The resultant electrostatic (ambipolar) potential moderates electron losses, but higher energy electrons are preferentially able to overcome the electrostatic potential (and conversely for low energy ions). The distribution is, thus, anisotropic and non-thermal. The overall result is that trapped plasma density not only declines, but the remaining trapped plasma is cooled. Since the higher energy ions contribute most to fusion, this is highly undesirable. The term "end losses" applies to both the loss of plasma and loss of energy.

A variation on the simple magnetic bottle concept is the field-reversed configuration (FRC). In such machines, the magnetic field established in the plasma via currents in the plasma, is opposite the external field (see FIG. 1). It should be noted that high temperature plasmas have very low resistivities; a kT=1.5 keV plasma has the resistivity of copper and the resistivity scales as $\sim T^{-3/2}$. Plasmas are diamagnetic.

The biggest technical obstacle to feasible magnetic-mirror thermonuclear reactors, and "open-ended" reactors in general, has been the inability to effectively "plug" the ends of these open-ended machines against losses. A variety of approaches (e.g., tandem mirror machines) have been tried. The difficulties with plasma losses in open-ended MCF machines led to the current preference for "closed" machines such as tokamaks and stellarators. These machines are considerably more complex (and expensive) and introduce topological complications and instabilities not found in linear open-ended machines. (Because of the closed magnetic field of the field-reversed configuration plasma floating in the external field, FRC machines are sometimes viewed more as closed machines; herein, however, they are treated as open machines.)

A means of more effectively closing the ends of open-ended machines can significantly advance their capabilities.

Plasma β

A useful concept is the plasma β. It is defined as the ratio between the pressure of the plasma ($p=n_e kT+n_i kT$ for isotropic thermal distributions) and magnetic pressure ($p_m=B^2/2\mu_0$). In a grossly simplified sense, if β is less than unity, the plasma is controlled by the magnetic field (though instabilities still apply). If β is larger than unity, the plasma controls the magnetic field.

In MCF, the overall β is assumed to be less than unity (though locally, it may exceed unity). Typically, the lower β, the more stable and controlled the plasma. Unfortunately, the fusion reaction rate increases with the number density of ions squared, so high density is desired. This also increases the plasma pressure (in MCF, the plasma must be quasi-neutral) and hence β. A common goal in MCF is thus to attain as high a β short of unity as possible while maintaining stability. In a tokamak, β~few percent, while mirror machines have attained over 80%, a major advantage in that the fusion rate goes $\sim \beta^2$.

If the magnetic field strength is limited (typically due to technical considerations) and β is limited (β<1, or often much lower due to instabilities), the relation between temperature, T and number density (assuming thermal equilibrium) is fixed, so $$n_i \sim \frac{1}{T}$$

and the power then goes as $$P \sim n_i^2 \langle \sigma v \rangle \sim \frac{\langle \sigma v \rangle}{T^2}.$$

Figure 4A:
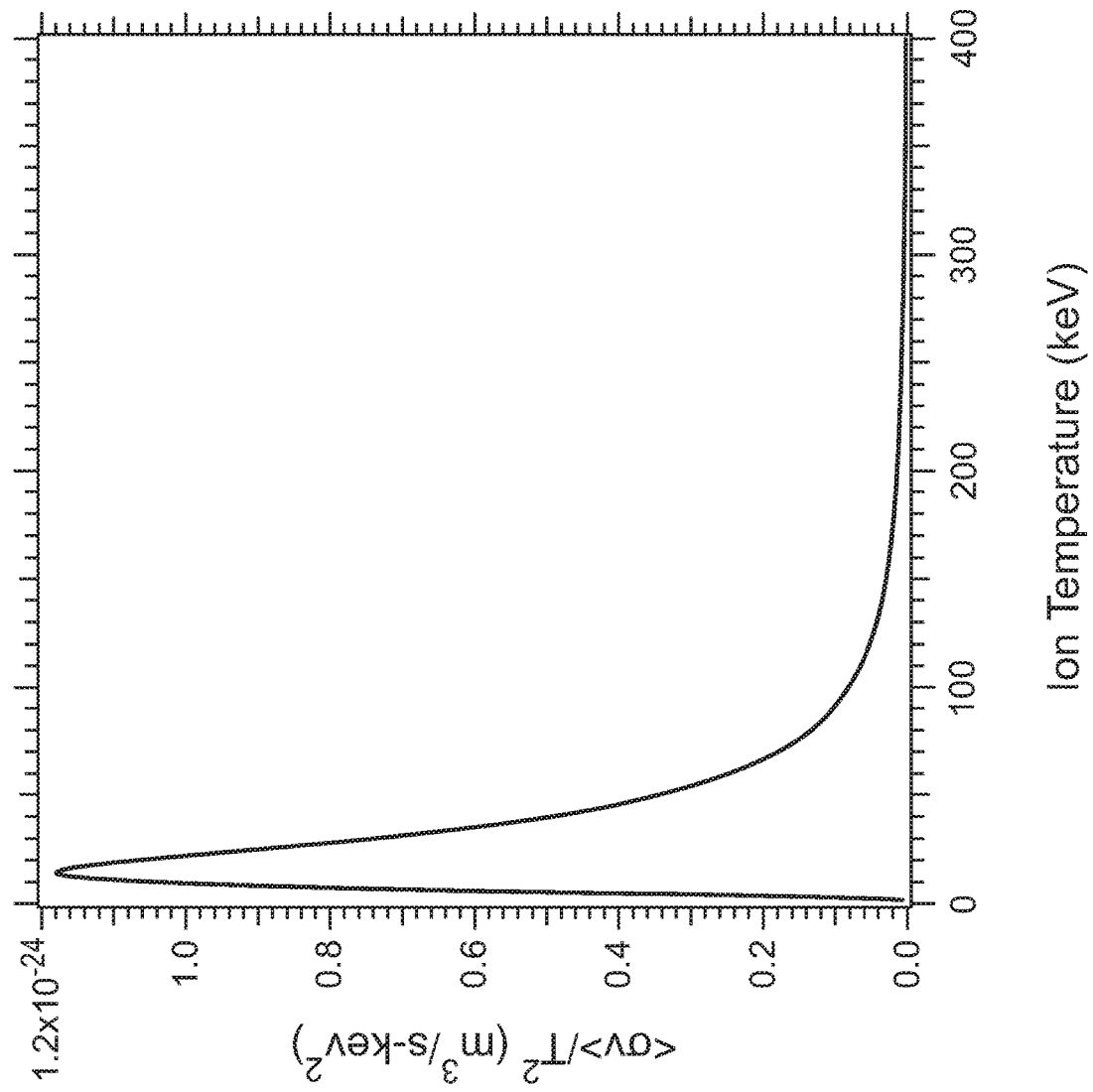
FIG. 4A is a plot illustrating a peak in the quantity ($<\sigma v>/T^2$) for D-T at about 15 keV.
Figure 4B:
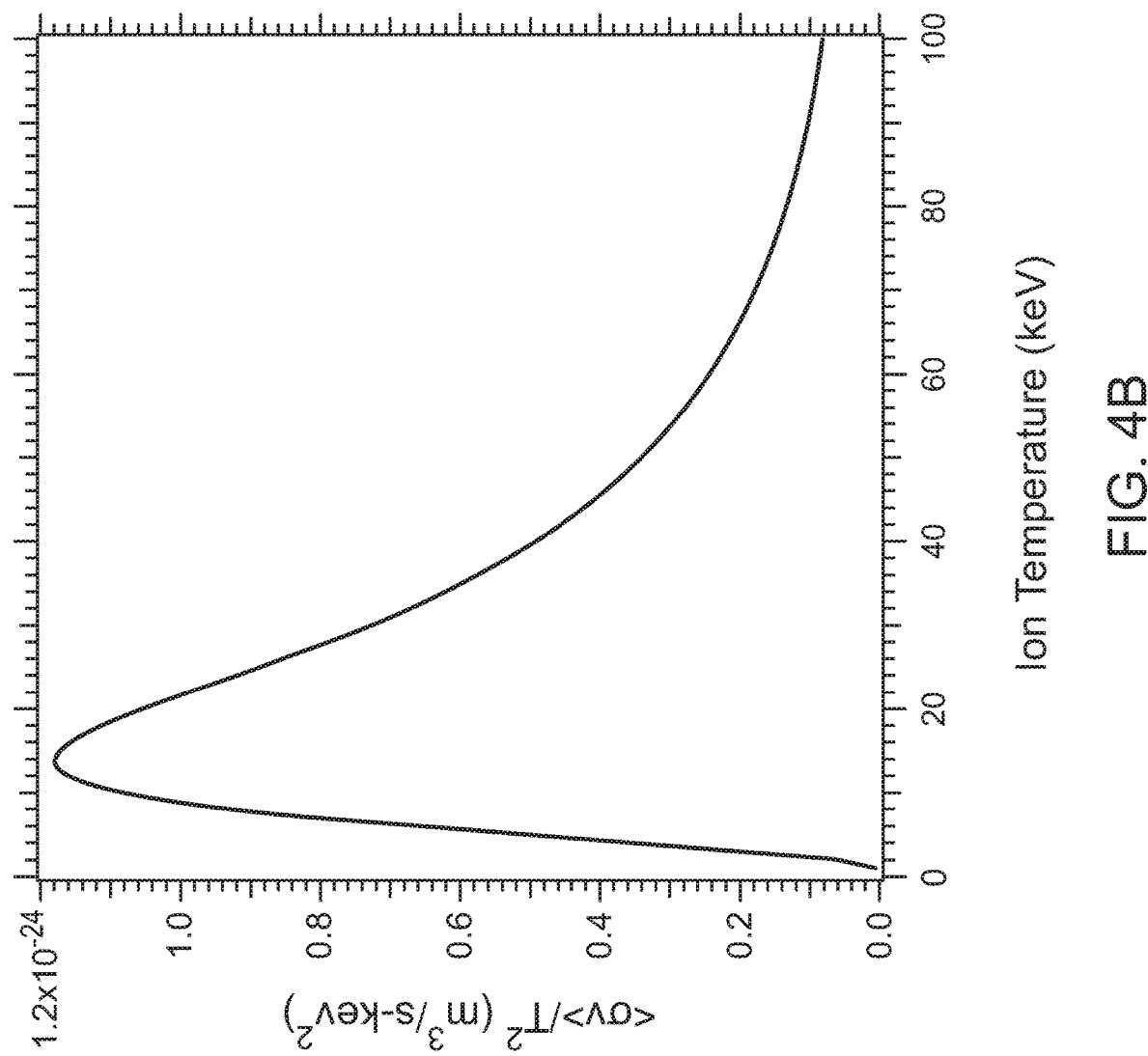
FIG. 4B is the plot of FIG. 4A shown with a different temperature scale.

This functional form determines the peak value will occur at a temperature of ~15 keV. Similarly, the value of the reaction rate at this peak will increase as $\beta^2$ and $\beta^4$. FIG. 4A and more clearly FIG. 4B show the peak in the power ($<\sigma v>/T^2$) at about 15 keV. The values plotted in FIGS. 4A and 4B were calculated by taking the nuclear cross section values plotted in FIG. 2 and dividing by their temperatures squared.

Open-ended Linear systems are subject to classic flute, sausage and kink instabilities. Ioffe bars carrying current external and parallel to the plasma can help reduce the instabilities, as can, for example, yin-yang magnets.

Space and Astrophysical Plasmas

Space and astrophysical plasmas exist over a wide range of conditions from the degenerate cores of some stars to extremely hot diffuse galactic clouds. (The cores of neutron stars may contain quark-gluon plasmas dominated by the strong nuclear force rather than electromagnetic forces.) For the purposes here, a useful starting point is the Solar Wind (SW).

The SW originates in the Sun's corona, a low-density upper region of the Sun's atmosphere that is heated though processes yet to be fully understood to ~2 MK. This results in an outflow of supersonic (super-Alfvenic) plasma at speeds of typically 400 to 700 km/s. In a very real sense, the SW is an extension of the Sun's corona. At large distances (~70 AU, but dynamic) the SW, as it expands into the local interstellar medium, transitions to subsonic flow at a boundary known as the termination shock.

The SW is an essentially collision-less plasma with nearly zero resistivity and (usually) high β—very different from laboratory plasmas which typical have densities 10 or 20 orders of magnitude higher.

As the zero resistivity would suggest, the SW carries with it the "frozen-in" or embedded magnetic field of the Sun. The radial motion of the SW would result in a radial field, but Solar rotation produces the Parker (or Archimedean) spiral characteristic of the quiet-time global Heliospheric magnetic field geometry. The outward- and inward-pointing field sectors are divided by a wavy current sheet. During Solar maximum, a period characterized by high Solar activity when the Sun's magnetic dipole field reverses, the system becomes vastly more complex, often with multiple current sheets.

While the bulk flow of the SW is supersonic, in the SW frame, the plasma is characterized by a variety of temperatures—plural because the SW's collision-less nature means species are decoupled, so different species (electrons, ions, different ion species) can have different velocity distributions and temperatures. Similarly, the temperature need not be isotropic with the velocity component parallel to the magnetic field ($v_∥$) differing from that perpendicular to the field ($v_⊥$). In other words, the SW is often far from complete thermodynamic equilibrium.

The quiet-time SW (i.e., during periods where the SW flow is steady) shows nearly thermal velocity distributions, however, superimposed on the ion distributions are higher-energy "super-thermal tails." These tails are typically larger during periods of high Solar activity. The origin of these tails, particularly during prolonged periods of low Solar activity, is an important and active area of research, but the ability of the SW to sustain (and, presumably, generate) such tails is an observational fact.

The simple flow of the SW can be disturbed by events on the Sun. This can result from faster plasma (e.g., a coronal mass ejection, or CME, or alternatively, faster SW streams) overtaking slower SW. The component of the embedded magnetic field perpendicular to the velocity of the overtaking plasma (in the SW frame) resists mixing with the overtaken plasma, resulting in compressional regions where both the plasma density and the magnetic field pressure are enhanced. In other words, the interface between the overtaken and overtaking plasma create a barrier. If the faster plasma is super-sonic in the SW frame, this results in the formation of a forward and, in some cases, a reverse shock.

Shocks in space and astrophysical plasmas accelerate particles via Fermi acceleration processes. CMEs can accelerate seed particles (possibly out of the super-thermal tail) to extremely high energies (>>1 GeV in some cases).

A Converging Plasma Pistons Machine

Consider an open-ended plasma machine (simple magnetic mirror machine or field-reversed configuration or any similar design). The confined plasma has a β significantly (perhaps much) less than unity and serves as the "target plasma" (TP).

Now consider two plasma masses ("pistons") projected at either end at a significant velocity.

As a piston encounters the end of the target region, it is slowed by the pressure of the TP. The piston is unable to push the target plasma ahead of it owing to the other piston impinging on the other end of the TP. Provided the ram pressure of the piston is sufficient, it will compress the TP while the trailing regions of the piston overtake the (now slower) leading edge (in analogy with a CME in the SW). The converging compressed plasma pistons compress the component of the TP magnetic field perpendicular to its velocity (large at the ends of the target regions, though small beyond the mirror regions). This forms—as with, for example, a CME in the SW—an effective barrier to the escape of the target plasma. So long at the pistons continue to converge (which depends upon ram pressure) the TP will be compressed.

FIG. 1 illustrates an example magnetic confinement system 100 that includes a magnetic mirror device 105. The magnetic mirror device 105 includes a chamber 110 and a coil arrangement 120. The chamber 110 is configured to hold a target plasma 115, here shown in a Field Reversed Configuration (FRC). The coil arrangement 120 is configured to generate a magnetic field configuration 130 in the chamber to confine the target plasma 115 in the chamber 110. As illustrated, the magnetic field configuration 130 has open ends 132, 134 and confines the target plasma 115 radially in cylindrical form between the open ends 132, 134. Because the magnetic field configuration is open-ended, plasma leaks at the open ends. The magnetic confinement system 100 further provides plasma pistons 136, 138, which are projected at the open ends 132, 134 of the magnetic field configuration 130. In operation, the plasma pistons 136, 138 converge towards each other, as illustrated by arrows 135, 137, to close (e.g., plug) the open ends 132, 134 of the magnetic field configuration and to compress and heat the target plasma 115. Closing the open ends can reduce and possibly nearly eliminate end leakage of target plasma.

As exemplified in FIG. 1, the coil arrangement 120 can include plural coils 122, 124, 126 arranged along a length of the chamber 110. While three coils 122, 124 and 126 are shown in the example, there can be any number of coils. The plural coils generate a longitudinal magnetic field to confine the target plasma 115 radially. Through action of the coils 122 and 126, the magnetic field is strengthened at or near the ends 132, 134 of the magnetic field configuration 130.

The chamber 110 can be cylindrical. The system 100 includes plasma guns 140 and 142 to generate respective plasma pistons 136 and 138 and to project the plasma pistons at respective open ends 132 and 134. The plasma guns can be linear railguns, in which case the chamber may be non-cylindrical to accommodate the railguns.

Suitable plasma guns for use with embodiments of the invention include coaxial plasma guns, such as those manufactured by HyperV Technologies Corp. (Chantilly, Va.) and described by F. Douglas Witherspoon, et al., "A contoured gap coaxial plasma gun with injected plasma armature," Review of Scientific Instruments 80, 083506, pp. 1-15, 2009.

The system 100 can further include a mechanism to further compress the target plasma 115 radially. This further compression of the target plasma may be appropriately timed in relation to the compression achieved by the plasma pistons. In an embodiment, the mechanism is configured to increase the magnetic field at a center region of the magnetic field configuration 130 to compress the target plasma 115 radially. For example, the system can be configured to increase the magnetic field generated by coil(s) 124, e.g., by increasing the current delivered to these coils, to compress the target plasma 115. As illustrated in FIG. 1, the mechanism can include a liner 144 positioned within the chamber. The liner is configured to implode to compress the target plasma 115 radially, as further described below.

The system 100 can be operating as a pulsed system. Each plasma piston can include a series of plasma pistons, illustrated in FIG. 1 as additional pistons 146 and 148.

Mass and velocity of each of the converging plasma pistons (e.g., pistons 136, 138, 146 and 148) can be selected to result in sufficient compression and heating of the target plasma 115 for the particular application, e.g., to produce thermonuclear fusion.

Each plasma piston can include material suitable to accomplish compression and heating of target plasma 115. For example, each plasma piston can include primarily a noble gas, such as Xenon, which is heavier than typical materials that make up the target plasma, such as Deuterium and Tritium. Alternatively, each plasma piston can include primarily thermonuclear fuel, in which case little or no target plasma may be needed to generate thermonuclear fusion, as further described below.

For fusion applications, the target plasma 115 can include primarily thermonuclear fuel. The target plasma can further include heavy ions to cool electrons via bremsstrahlung, reducing their contribution to the pressure in non-equilibrium conditions.

The system 100 can be configured such that the target plasma has a high β, of order unity upon compression, where R is the ratio of pressure of the plasma and magnetic pressure due to the magnetic field.

The compression of the Target Plasma (TP) will add energy to the target plasma.

Heating (equilibrium or non-equilibrium) will result. With the improved confinement at the ends—the pistons becoming the long-sought "plugs"—and the compression and heating, this represents a possible option for improved thermonuclear fusion with open-ended fusion machines. This might be considered a form of plasma-driven magneto-inertial confinement fusion, though the radial confinement is effectively purely magnetic and the confinement at the ends is essentially magnetic, with the pistons modifying and amplifying the field geometry and perhaps contributing their own fields. Aspects that will require consideration include mixing, merging and thermal transfer between the pistons and the target plasma.

Compression heating can be a very efficient approach to plasma heating; plasma guns in which ~50% of the expended energy is in the kinetic energy of the projected plasma exist. In practice (see below) the initial compression is likely to be non-thermal, at least for the ions, quickly thermalizing if the conditions can be maintained. If the plasma pistons can be held in position (e.g., by a j×B force, similar to that used by many plasma guns to accelerate the projectile plasma) and held for a sufficient time useful power could be produced.

As schematically illustrated in FIG. 1, the magnetic confinement system 100 can include means 150, 152 to hold the plasma pistons in position after compression of the target plasma. The means 150, 152 can provide a j×B force (a term in the Lorentz force) to hold the plasma pistons. The means 150, 152 can be an extension of the plasma guns 140, 142 (e.g., railguns modified to generate plasma pistons and hold the plasma pistons in position). Holding the plasma pistons 136, 138 in position after having compressed the target plasma 115 can move the system from pulsed to steady-state (in the MCF sense of order of a second vs. milliseconds).

Another more radical possibility exists.

For a low-density and/or high temperature target plasma, where collisions play little role, the ions and electrons will reflect successively off each converging plasma piston. Furthermore, the magnetic field between the plasma pistons is quasi-parallel to the piston velocities and, thus, the average impulses (change in vector momentum) to the ions and electrons. This geometry is ideal for second-order Fermi acceleration as electrons and ions reflect off one converging plasma piston, then the other, going back and forth, gaining energy with each encounter. (The classical analogy of ping-pong balls between two converging walls applies.) Since the velocity addition to the ions is preferentially parallel to the pistons' velocities, this results in an anisotropic ($v_\parallel > v_\perp$) highly non-thermal distribution with super-thermal tails—a commonly observed circumstance in space plasmas such as the Solar Wind.

If the density is sufficiently low that collisions play little role, this technique might have practical applications for particle accelerators that could be smaller, for their maximum energy, than conventional machines such as cyclotrons or synchrotrons. Such machines, using a proton (H) plasma, could, for example, be used for the production of radioisotopes for medical and other applications.

Consider an intermediate condition target plasma. This plasma will have a relatively low-β, promoting confinement and stability. The converging plasma pistons accelerate ions, promoting an anisotropic non-thermal energy distribution with high-energy tails. The competing process is collisions that tend to thermalize and isotropize the ions and electrons. The relative rates depend upon the number density, with the collision rate depending upon the number density squared and the inverse of temperature of the thermal component of the plasma to the three-halves. So, for a given temperature, does the fusion reaction rate depend upon number density squared.

Fusion cross-sections, up to the peak of $\langle \sigma v \rangle$, favor higher energies in a thermal or non-thermal distribution; accepting lower densities and promoting high-energy tails (and anisotropy) can increase the fusion rate overall if $\langle \sigma v \rangle$ rises more quickly than $n_i^2$. If the non-thermal tails extend to or beyond the maximum of the fusion cross-section, then ions in the lower energy thermal distribution become fusion targets. From the point of view of energy efficiency, keeping the temperature of the thermal portion of the distribution low minimizes the energy required to run the machine.

One concern will be that high-energy ions and electrons will tend to escape more easily. If they are at energies significantly beyond the peak of fusion cross-section, the loss will primarily be of energy (some may then be recoverable as heat). Unequal losses between ions and electrons will result in an ambipolar potential that will tend to equalize the losses.

Using non-thermal distributions to promote nuclear fusion is not novel; it has been exploited in electrostatic confinement machines (e.g., "fusors"). As a practical energy source, such machines suffer from rapid thermalization and energy losses, though they have been exploited with some success as neutron generators, also a possible application for converging plasma piston machines. By contrast, in a converging plasma piston machine as here envisioned, magnetic confinement means energy loss rates are not significantly greater than in conventional fusion machines. Again, in contrast to electrostatic confinement, where the ions start with an initial non-thermal energy distribution (often a single narrowly peaked energy) and then relax, due to collisions, into a thermal distribution, the second-order Fermi acceleration produced by the converging plasma pistons is a continuing source of non-thermal acceleration until the pistons stop.

Relaxation Times

The thermal relaxation times in plasmas scale as the temperature to the three halves ($\sim T^{3/2}$) and are inversely proportional to the number density of the scatters. Scattering also depends upon the square-root of the mass ($\sim m^{1/2}$). Thus, the relaxation time for electrons is dominated by electron-electron scattering. The relaxation time for ions is dominated by ion-electron scattering and, for deuterium, is approximately 60 ($\sqrt{m_d/m_e}$) times longer than for electrons. Ion-ion scattering is slower still.

Piston velocities and compression times will thus determine the thermal regime of the target plasma.

For very rapid pistons, where the compression time is less than the electron-electron relaxation time (and hence, also the ion-electron relaxation time), the transverse (perpendicular to the magnetic field) temperatures of both the electrons and ions ($T_{\perp e}$ and $T_{\perp i}$ respectively) will, ideally, remain constant (e.g. the same as the TP had before compression). Thus, as the compression takes place, the radial pressure ($P_\perp$) will increase only with the increase in densities resulting from the decreasing volume. For a given β and B, much greater ion densities can be confined radially with a corresponding increase in reaction rates ($\sim n_i^2$). In addition, $\langle \sigma v \rangle$, will increase with the higher longitudinal ion velocity ($v_\parallel$), beyond that associated with the perpendicular temperature ($T_{\perp i}$). It should be noted that the confinement time in this case is limited by the electron-electron relaxation time.

For slower, but still rapid compressions, where the compression time is less than the ion-electron relaxation time, but longer than the electron-electron relaxation time, only the transverse temperature of the ions ($T_{\perp i}$) will remain constant. On compression, the radial pressure, which determines β will be $$p = n_e k T_e + n_i k T_{\perp i}.$$

With compression, the electron temperature will (unlike $T_{\perp i}$) increase, so electron pressure will dominate, resulting in approaching half the pressure of a system in thermal equilibrium. This means, for a given β and B, the ion number density can approach twice that of an equilibrium plasma, and the reaction rate nearly four times higher. While the reaction rate (and power) will thus be less than in the preceding case, the confinement time (and energy produced) can be ~60 times greater. The higher value in $\langle \sigma v \rangle$ sill applies as the ion velocity distribution is still anisotropic and, with only one degree of freedom (parallel to the longitudinal magnetic field) the ion energy will be higher than the electron temperature ($T_{\|i} \sim 3 T_{\perp e}$, to the extent the parallel velocity distribution follows a Boltzmann distribution.)

From the above, the desirability of decoupling temperatures (electrons and ions, perpendicular and parallel) is clear. In the previous case, ideally the ion perpendicular temperature ($T_{\perp i}$) remains constant under compression, the electron temperature ($T_e$) rises, while the parallel ion energy ($T_{\|i}$, to the extent it is thermal) rises, but more rapidly. Physically, this takes the problem beyond the conventional 15 keV temperature of the peak of the function form $$P \sim n_i^2 \langle \sigma v \rangle \sim \frac{\langle \sigma v \rangle}{T^2}$$

(see FIG. 4A) because the radial pressure (which is limited by the radial β and the magnetic field) has a lower effective temperature, enabling a higher density, while $\langle \sigma v \rangle$ is increased because of the higher parallel ion temperature (or, more correctly, energy distribution) which is contained by the converging plasma pistons. Increasing either or both the ion number density and $\langle \sigma v \rangle$ increase the reaction rate.

Electron Cooling

For the pulsed case above, the electron temperature should be high enough that the relaxation time is long enough not to significantly impact the non-thermal conditions. Depending upon the initial electron temperature, some increase in temperature to compensate for increasing density may be advantageous; additional heating is undesirable as it increased the pressure, requiring a lower density for a given β and field strength.

Electrons lose energy via bremsstrahlung with power loses scaling as $\sim n_e n_i T^{1/2}$. The loss rate also depends upon the ion (or nuclear, assuming full ionization) charge squared ($\sim Z^2$). Thus, the presence of small amounts of heavy ions greatly increases bremsstrahlung losses, albeit while also increasing the electron density, and hence pressure for a given temperature. For a machine where the electron and ion temperatures are in equilibrium, this cooling is highly undesirable and such ions are contamination to be minimized. In the case where the electron temperature is effectively decoupled from the ion temperature (and $\langle \sigma v \rangle$), increasing bremsstrahlung by adding a small injection of heavy ions, may be beneficial, facilitating a higher ion number density and so reaction rate.

Pinch

Pulsed systems have often depended upon pinch effects to heat and compress the plasma. In terms of linear systems, a "z-pinch" is a longitudinal electric current through the plasma resulting in an increasing azimuthal magnetic field that compresses and heats the plasma. A "theta-pinch" is an increase in azimuthal current (e.g., induced by increasing the external magnetic field) that compresses and heats the plasma.

In any MCF machine, the maximum magnetic field from the external coils is determined by technical and engineering limitations. In conventional mirror machines, the magnetic field at the ends is usually determined by these factors, while the center field is determined by the desired mirror ratio. In a converging plasma piston machine, once the pistons have plugged the ends, the mirror ratio may no longer be relevant (or even meaningful) so the center field can be increased, resulting in a theta-pinch. This could further increase the density and heat the plasma.

A more extreme approach is an imploding liner (see also FIG. 1 above). A thin liner (presumably solid or composed of wires) surrounds the plasma and is imploded either by electric currents (also, in effect, a z-pinch) or by chemical explosives. Converging plasma pistons could plug the ends. This clearly is in the realm of inertial confinement with very high plasma densities.

Piston Magnetic Fields

Thus far, any magnetic field embedded in the plasma pistons has been ignored. A field component perpendicular to the velocity (radial or otherwise) could improve confinement, however magnetic reconnection with the target plasma must be considered. Reconnection is the reordering of magnetic field geometry accompanied by the release of magnetic energy. Reconnection can heat the plasma, produce super-thermal particle acceleration, but also contribute to instabilities. Coaxial plasma guns, one candidate for producing plasma pistons, produce azimuthal (toroidal) magnetic fields perpendicular to the radial component. It is worth mentioning that the azimuthal fields are a poor geometry for magnetic reconnection to the radial field component (and, for that matter, the linear component).

As a piston impinges upon a TP, it too is compressed. This process will also compress any magnetic field component perpendicular to the compression vector (effectively, the velocity vector), increasing the magnetic field, and the magnetic pressure.

While in the above-described magnetic confinement system each converging piston is a single blob (e.g., mass) of plasma, a series of plasma pistons from each end can also be implemented. This might place more modest technical requirements on the system that creates and accelerates the pistons.

A Dynamic System

Clearly, the proposed machine operates under rapidly changing conditions, as the target plasma is compressed by the two converging plasma pistons, whose own velocities decreases in response. Furthermore, when significant nuclear fusion occurs in the target plasma, this adds energy to the target plasma from any charged fusion products (e.g. $^4$He in a D-T reaction). Photons and neutrons escape almost freely. Again, design optimization can be used to control the reaction. Eventually, the converging pistons stop, unless the ram pressure is such that the TP is effectively dispersed, in which case the pistons collide. Under some conditions, the plasma pistons may even reverse direction, potentially extending the confinement and reaction times in a fusion application. In the case of a system operating far from equilibrium, dispersal is likely to result as equilibrium is attained.

The masses of the plasma pistons and their velocity are believed to play a key role in any design. While a high velocity may be beneficial to acceleration and confinement, the reaction time, $\tau$, may benefit from a lower velocity. Again, these are parameters that can be optimized in any design for the desired application. (E.g., an ion accelerator likely favors high velocity convergence since $\tau$ is irrelevant.) The ram pressure results from both the velocity and mass of the plasma pistons.

No specific mention of shocks has been made. Second-order Fermi acceleration does not require shocks.

Shocks have advantages in that they are more effective reflectors, providing a better barrier to escape. If the plasma pistons are super-Alfvenic, there may be advantages in convergence times compared to the time scales for instability formation and growth.

If the plasma pistons are super-Alfvenic before encountering the target plasma, they may become sub-Alfvenic as they slow. At the same time, the Alfven velocity of the TP is changing as it is compressed and the density increases. Thus, it is possible initially sub-Alfvenic plasma pistons can transition to shocks if the Alfven velocity in the TP becomes sufficiently small. Again, for fusion applications the reaction time should be considered.

Scaling Considerations

Starting with a target plasma in a standard magnetic mirror configuration, the limit as to ion density and temperature as the pistons converge is the radial (transverse) gas pressure ($P_i$), and resultant $\beta$. This limits the maximum $n_i T_\perp$, since the longitudinal magnetic field is determined by the initial target plasma magnetic configuration (perhaps enhanced by pinch) and the piston compression does not strengthen the field since the piston's compression direction (vector) is parallel to the longitudinal field component. Assuming adiabatic compression of the plasma, and thus ignoring any contribution from fusion heating (e.g. He from a D-T burning), and assuming thermal equilibrium, the plasma temperature goes as an ideal gas:

$$T \sim n_i^{2/3}$$

so the plasma pressure goes as $$P \sim n_i T \sim n_i^{5/3}$$

and $$\beta \sim \frac{n_i T}{B^2} \sim \frac{n_i^{5/3}}{B^2} \sim n_i^{5/3}$$

This, as noted above, is the limit on the confinement. The scaling is not favorable.

An alternative target plasma magnetic configuration is an azimuthal (e.g. toroidal) magnetic field. This is seen, for example, in the plasmoids produced by some co-axial plasma guns. A spheromak configuration embedded in an open-ended external field similar to a mirror machine would be another example.

Spheromaks are related to a field-reversed configuration (FRC). Both are sometimes classified as "compact tori."

In a FRC an azimuthal (sometimes described a toroidal, despite the elongated shape of many FRC plasmas) current produces a poloidal magnetic field. This is certainly a suitable target plasma, and could have advantages over a pure magnetic mirror TP. However, except at the ends, the field is also longitudinal, so compression by pistons from the ends does not increase the field strength (nor does the magnetic field pressure oppose compression) thus radial confinement follows the same scaling relation as the pure mirror machine target plasma.

In a spheromak, a poloidal current in the plasma produces an azimuthal (toroidal) magnetic field. There is also a poloidal field, as in an FRC. This results in a helical field. Theoretically, helicity would be conserved on compression. (One potentially confusing aspect of magnetic fusion terminology is that a "tokamak" is a machine, but a "spheromak" is a plasma configuration. That machines designed to create spheromaks are often referred to as "spheromaks" adds to the confusion.)

The spheromak magnetic configuration is similar to the plasma in a tokamak with a toroidal field and a poloidal field proving helicity and stability. However, in a tokamak, external coils largely produce the toroidal field while an internal toroidal current produces the poloidal field. In a spheromak, both the toroidal and poloidal fields are produced by currents in the plasma.

As with a FRC plasma, a spheromak may be held in a magnetic field closely resembling that of a pure mirror machine. Thus, while the two plasma configurations are not, strictly by some definitions, open, the machine is effectively an open-ended geometry.

A crucial aspect of spheromak formation is magnetic reconnection. This is intrinsic to the process of producing a spheromak. Plasmas with a mixture of toroidal and poloidal magnetic fields tend to reconfigure themselves via reconnection into a spheromak. The classic example occurs in plasma guns designed to produce spheromaks.

In a target plasma with a toroidal field configuration, the magnetic field is perpendicular to the piston velocity vectors. Thus, with the toroidal field produced by currents in the plasma, the field increases with compression. Of course, the compression has to work against both the plasma pressure and the magnetic pressure, requiring more kinetic energy in the pistons. This energy may be recovered electromagnetically at a higher efficiency than thermal energy conversion.

The advantage is that the magnetic field, ignoring resistive losses, goes as $$B = B_0 \frac{V_0}{V} = B_0 \frac{n_i}{n_{i0}}$$

where $B_0$, $V_0$ and $n_{i0}$ are the magnetic field strength, volume and ion number density before compression respectively, while $B$, $n_i$ and $V$ refer to any given point in time. This means that $$\beta \sim \frac{n_i T}{B^2} \sim \frac{n_i^{5/3}}{n_i^2} \sim n_i^{-1/3} \sim \frac{1}{\sqrt[3]{n_i}}$$

which is a far more favorable scaling than the longitudinal field case—$\beta$ can go down slowly with compression, potentially improving confinement. It also means that the maximum magnetic field strength in the plasma is no longer limited by magnet technology.

The fusion reaction rate goes as $\sim n_i^2$.

If a single pair of plasma guns is used to produce the plasma pistons, a spheromak target plasma appears to geometrically favor coaxial plasma guns.

Figure 5A:
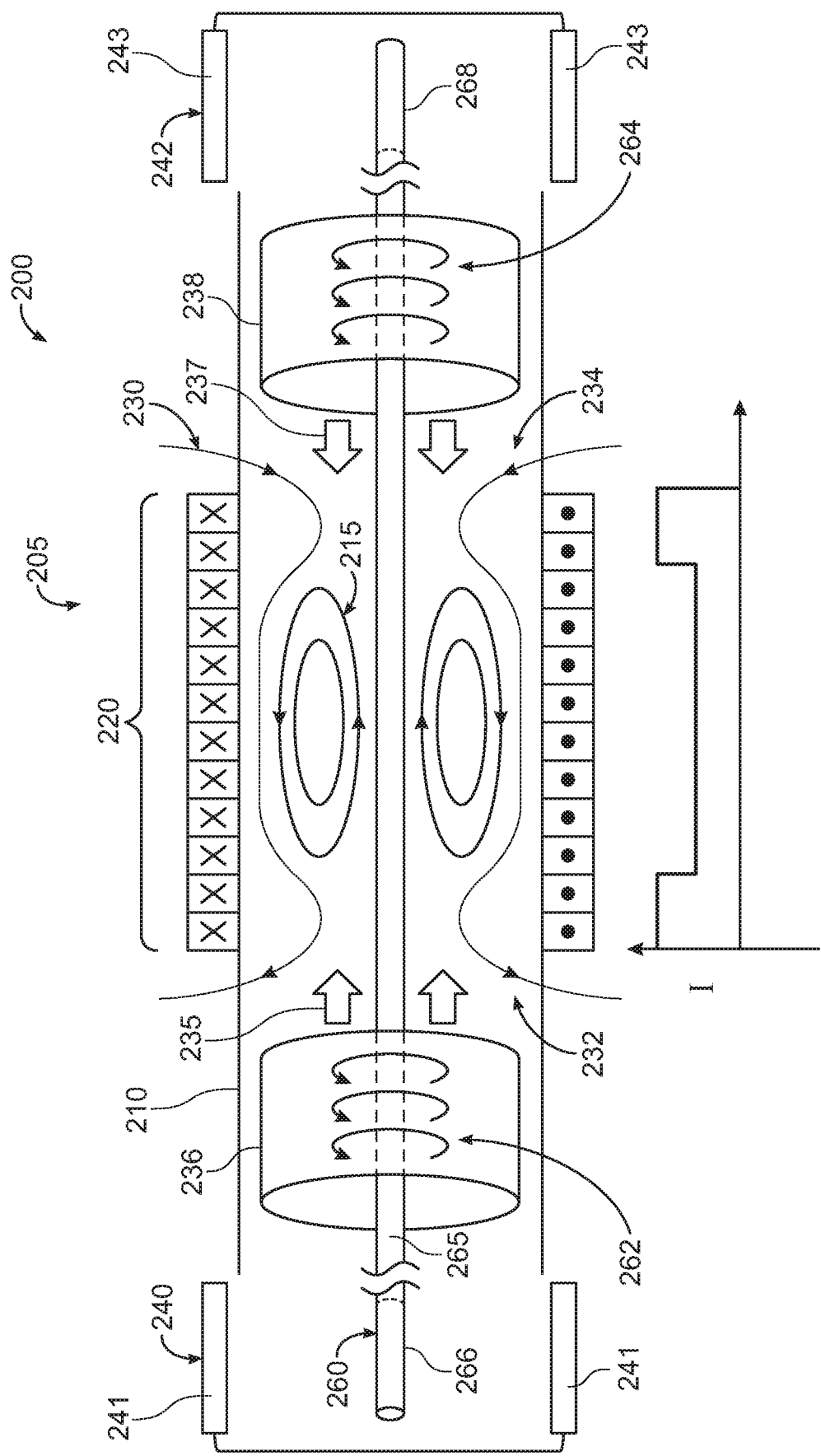
FIG. 5A is a schematic diagram of a magnetic confinement system illustrating a field-reversed configuration (FRC) target plasma (TP) with plasma pistons converging towards each other to compress the TP. The system includes a central conductor to stabilize the plasma pistons and the target plasma.

One way to generate the converging plasma pistons is to have a single central electrode for both plasma guns that bridges the gap between two shells (one for each gun), as for example illustrated in FIG. 5A, where a central structure can incorporate or consist of a single central electrode. A shell then is an outer electrode surrounding the inner central electrode of a coaxial plasma gun. Current passes from (or to) the shell, through the plasma, to (or from) the central electrode. The current produces an azimuthal magnetic field and a Lorentz force. The spheromak TP can be formed in the gap, centered on the electrode. (This could be done by merging two spheromaks with co-helicity created by the guns.) In this embodiment, the voltage to create the plasma pistons can be applied across the two shells. The current can pass though the plasma on an inward radial path in one gun, pass through the central electrode (thus producing the azimuthal magnetic field for both guns) and hence though the other gun's plasma in an outward radial path. The currents could also ionize and, if necessary, vaporize the material that becomes the plasma pistons. This can accelerate the plasma pistons towards each other with magnetic field configurations matching the direction of the toroidal field of the spheromak. This is not the only geometry possible, but it can provide temporal coordination between the pistons. The current through the central electrode may tend to stabilize the centering of the spheromak and may be continued by direct circuit after the plasma pistons leave the plasma guns. A central conductor would also oppose the tipping instability of the spheromak by eddy currents; an external current applied to the conductor would further stabilize against tipping of the target plasma.

Extending Confinement Time

Using plasma pistons to create a high-density hot target plasma (TP) seems very feasible, but simple modeling shows the time spent under those conditions (τ) is too short to achieve a useful energy production with current magnet technology. It is necessary to extend the confinement time beyond the point where the pistons stall. Ideally, the method used would also allow the pistons to be further forced into the TP, doing work on the plasma to add energy. Such an approach would also allow the machine to make up for losses from the TP, and, ideally, from the pistons as well, to maintain fusion condition.

One option is a second set of shells at the point where the pistons stop, so a current could be forced through the pistons (this would be after the target plasma was compressed so the current goes through the pistons, not the TP), using the Lorentz force to hold the pistons and assembled plasma and let fusion proceed. The difficulties are the high currents required and the radial dependence of the Lorentz force in this geometry. Even when the plasma pistons are not moving, and so no work is done, there would be external resistance (the plasma resistance being miniscule), which would lead to losses. This might be overcome technically (e.g., a homopolar generator with very low internal impedance), but the gradient in the Lorentz force is intrinsic.

The alternative is to pin the pistons magnetically, either solely, or in combination with the Lorentz force.

A Specific Embodiment

The idea of using coaxial plasma rail-guns to produce the plasma pistons is not restricted to spheromak target plasmas.

The geometry also suggests using a field-reversed configuration (FRC) target plasma. This too would accommodate a conductor down the center, potentially with an external current, to center both the plasma pistons and the FRC target plasma. This could also serve to complete a circuit between the two rail-guns (current from one shell going through the plasma to the center, hence through the central conductor to the other plasma and through it to its shell). In contrast to a spheromak TP, a FRC avoids the pistons doing substantial work against the magnetic field. The kinetic pressure of the TP would dominate.

Figure 5B:
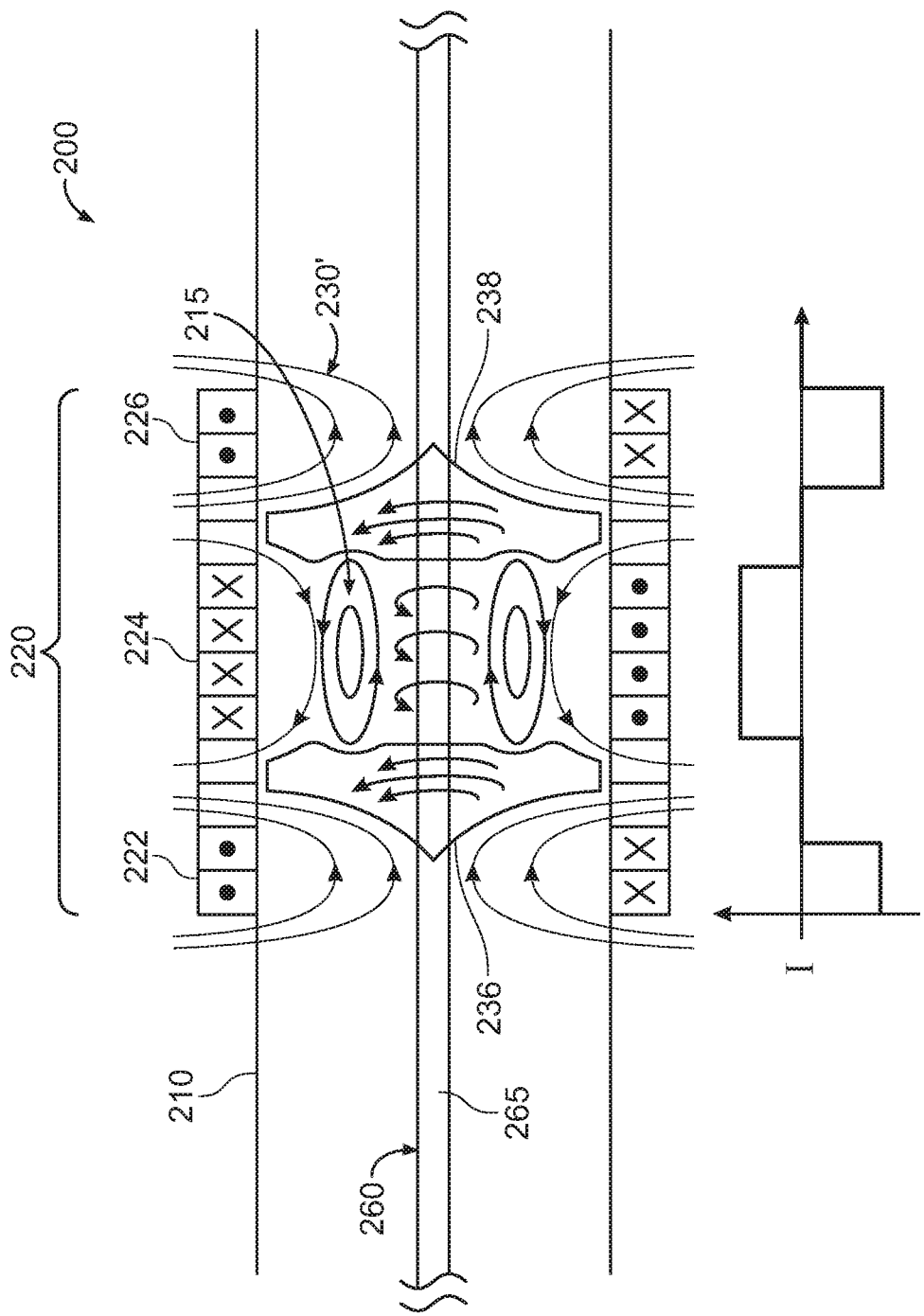
FIG. 5B is a schematic diagram of the compressed TP of the system of FIG. 5A with the current in some of the field coils relaxed to let the pistons contact the TP while providing a partial cusp field on the inner sides of the pistons and a full cusp field on the outer sides of the pistons.

FIG. 5A illustrates an example field-reversed configuration (FRC) target plasma (TP) 215 held in a chamber 210 by a magnetic field 230 produced by outer coil arrangement 220. A central conductor 265 extends through the chamber 210. Also illustrated are plasma pistons 236, 238 converging towards each other, as indicated by arrows 235, 237, to compress the TP 215. The figure includes an indication of the azimuthal fields 262, 264 in the respective pistons 236, 238. Other systems or components may be included between the chamber 210 and the coils 220. In FIG. 5A and FIG. 5B, the direction of current in the coils is indicated using the 'x' and 'dot' convention. The magnetic field lines 230 and their directions are shown. A plot of current (I) in the field coils as a function of axial position is shown below each of the system diagrams in FIGS. 5A and 5B. These plots should be considered as illustrative, not quantitative. FIG. 5B shows the configuration following compression of the TP. As illustrated in FIG. 5B, the end coils 222, 226 of coil arrangement 220 can have reversed current to provide the other halves of the cusp fields pinning the pistons 236, 238.

A cylindrical central chamber 210 is defined by external coils 220, as in classic mirror machines, to hold the target plasma 215 and, after the fusion configuration is assembled, the pistons 236, 238 as well. Coaxial rail-guns 240, 242 extend from either end 232, 234 with a single axial structure 260 extending the whole of the machine's length. This structure includes, at a minimum, the central conductor 265 and electrodes for the rail-guns 240, 242. Each coaxial rail-gun (240, 242) includes a shell electrode (241, 243) and a central electrode (266, 268). Current from a power source (not shown) typically flows through the shell (241, 243) to the central electrode (266, 268), with the circuit being completed by the projectile, i.e., the plasma piston (236, 238). In the embodiment illustrated in FIG. 5A, the central structure 260 comprises the central conductor 265 joined at one end to a central electrode 266 of the rail gun 240 and at the other end to central electrode 268 of rail gun 242. The central conductor can be electrically coupled to central electrodes of the rail guns, thereby forming a single central electrode. In that case, current can pass from a shell electrode through a plasma piston of one plasma gun, down the central electrode, and through another plasma piston and shell electrode of another plasma gun. The central conductor and the center electrodes can be integrally formed from suitable conducting material. In an embodiment, the central conductor/electrode is hollow. It may also support other systems as needed.

The first stage is to form a field-reversed configuration target plasma. This can be formed in any number of ways. Given the machine geometry, one option would be to include suitable coils in conjunction with the rail-gun plasma formation so the guns produce spheromaks with counter-helicity and project them into the central chamber. The two spheromaks merge to form a FRC plasma, the kinetic energy and magnetic reconnection energy going into heating. Once formed, the FRC plasma could be further heated and/or its density enhanced by external means such as neutral beams or resonance heating. (A whole technical arsenal has been developed for magnetically confined plasmas—open or closed.) The resulting TP 215 is held in the conventional fashion by a magnetic mirror field configuration (205) produced by the external coils 220. A central conductor, e.g., a conducting layer on the center structure 260, can further enhance stability, as can a conducting layer in the surrounding chamber shell. An external current through the center structure can produce an azimuthal field that can further enhance stability.

In the second stage, illustrated in FIG. 5A, the plasma guns 240, 242 project plasma pistons 236, 238 at the FRC target plasma 215. These pistons can have azimuthal (toroidal) fields. Any poloidal component should be minimized. If the guns can produce spheromaks (e.g., to form the TP), they can be operated so as to not produce the seed poloidal field required for the formation of spheromaks. These pistons 236, 238 thus have intrinsic magnetic fields 262, 264 perpendicular to the poloidal field of the FRC target plasma 215. This configuration is to minimize vector reconnection when the pistons contact the TP. As the pistons 236, 238 enter the central chamber, the current in the external coils 220 is adjusted. First, the current in the field coils at the outer end of the TP 215 is relaxed to eliminate the mirror so as not to impede the impinging pistons. As the TP 215 is compressed, the current in the coils at the ends of the TP 215 forced inward by the pistons 236, 238 is relaxed while maintaining the field in the coils along the shortened TP. The pistons now determine the positions of the ends of the TP.

The converging plasma pistons 236, 238 heat and compress the TP 215. The pistons are also compressed and heated in the process, increasing the plasma pressure. Compression also increases the azimuthal (toroidal) magnetic field and magnetic pressure. As shown above, the piston's $\beta$ is incidentally reduced. This is in contrast to the field in the TP, which is largely parallel to the compression vector, so work is principally done on the TP plasma, not its embedded field. The piston temperature would likely be much less than the target plasma's (e.g. ~100 eV as opposed to ~10 keV for the compressed TP in a D-T reactor).

In the third stage, illustrated in FIG. 5B, the plasma pistons 236, 238 have begun to stall against the TP 215. On the outer side of the pistons, the field is increased as they stall, but the current in the end coils 222, 226 is reversed compared to its original direction. The current in central coils 224 of the coil arrangement 220 is not reversed. The pistons 236, 238 are thus in a cusp magnetic field 230' modified on the inner (but not the outer) side by the presence of the TP 215. This cusp configuration pins the pistons in place while fusion proceeds, increasing confinement time. This is the fusion assembly.

A number of refinements apply to this basic embodiment.

The central field may be increased to provide a pinch on the TP just prior to, during, or after the compression by the plasma pistons.

The cusp configuration inherently means the plasma is in contact with both the chamber shell and axial structure, resulting in cooling and loss of ionization. The low resistivity of the plasma that forms the pistons is crucial. Electrodes in the shell and center structure can provide a current through the piston plasma for Ohmic heating and, incidentally, contribute a Lorentz force (j×B). Other standard plasmas techniques can also be used.

Moving the outer cusp fields 230' inward by progressively (sequentially) providing current to external coils can maintain the piston pressure and temperature against losses. Similarly, the process can add pressure via the pistons 236, 238 against the TP 215. By then also moving the inner cusp field (the edge of the field radially containing the TP) inward, the FRC target plasma can be further compressed. This may be done to maintain fusion conditions in the TP against losses. It may also do work against the TP if the initial kinetic energy of the pistons is insufficient to attain the desired compression and heating of the TP. There will be design and engineering trade-offs between the kinetic energy of the pistons and the work done by the external coils (and any sustaining current through the piston) in bringing the TP to initial fusion conditions. At one extreme, the piston kinetic energy alone suffices; at the other, the pistons have only enough kinetic energy to attain a suitable configuration with most of the work done by the coils. In any case, assembly would be rapid, with the pistons plugging the ends of the target plasma, while the magnetic configuration holds the assembly together for energy production. Ideally, the energy production continues until the rising temperature and pressure of the TP exceeds the radial confinement limit ($\beta$~1).

Conclusions

The converging plasma piston machine here envisioned has at least three possible applications.

1) The machine can offer a new tool for plasma studies, both laboratory and space/astrophysical in thrust;
2) The machine can be used as a compact particle accelerator using second-order Fermi acceleration;
3) The machine can have uses in nuclear fusion research, perhaps leading to a practical nuclear fusion reactor or neutron generator.

Under this last application, there are two possible approaches.

A) The biggest challenge to open-ended fusion machines has been a method to "plug" the ends of the system. Based upon space and astrophysical plasmas, the envisioned converging plasma pistons offer a greatly improved method, with the added advantage of providing efficient heating and compression.

B) The converging plasma piston machine opens a new approach to fusion by promoting high-energy non-thermal systems (again, in analogy to space and astrophysical plasmas). This to a significant degree decouples the plasma density-temperature relation from the thermonuclear physics ($\langle \sigma v \rangle$). This makes the plasma density a quantity to be optimized to a design.

Additional research can show if A) or B) can lead to a practical nuclear fusion reactor.

If a converging plasma piston fusion reactor proves feasible, it is expected to be substantially simpler than the current MCF closed reactor candidate designs—tokamaks and stellarators. Design, construction and maintenance costs can be vastly lower. This means that, even if a colliding piston machine approach required a physically larger reactor, it can still be advantageous in cost.

The geometry of toroidal machines (including both tokamaks and stellarators) is challenging from the point of view of a practical reactor. Assuming a D-T fuel cycle, the reactor must be surrounded by a T-breeding blanket (normally assumed to be lithium) and radiation shielding. Placing blanket, shielding, and coils (and, for a tokamak, the core or cores for inducing the required toroidal current) in the "hole of the donut" is believed to be a major design challenge. This challenge does not exist in linear designs, such as the proposed converging plasma piston machine.

Owing to induced radioactivity, maintenance of a fusion reactor (at least using D-T or any fuel cycle that produce significant neutron radiation), can be challenging. It is expected to be robotic in nature, making geometric simplicity a major advantage. Internal parts (e.g., liners) in a linear open system (including a converging piston machine) can be simply slid in and out of a reactor provided the reactor chamber has suitable lids on the ends. Sections could also be configured for movement (e.g., on rails). Similarly, external systems (blankets and shielding) can largely be cylindrical and easy to maintain, even robotically. The geometric simplicity and ease of maintenance are some of the advantages over conventional toroidal systems.

Finally, high-β linear machines are regarded as far a more promising path towards advanced fuel cycles (e.g., D-D or aneutronic cycles such as $^1$H-$^{11}$B) than closed machines.

Another advantage of embodiments of the present invention relates to scaling. Unlike some existing confinement approaches, the converging plasma approach described herein provides the benefit that a larger machine (all other things being equal except the masses of the target plasma and pistons) is expected to generate more energy out for a given energy in.

While the coils (120, 220) in the embodiments in FIGS. 1 and 5A-5B are shown in direct proximity to the plasma chamber (110, 210), it is also possible other systems would be placed between the coils and chamber. For example, in the case of a D-T reactor, a tritium-breeding blanket could be placed between the coils and chamber, both to maximize the neutron economy and reduce the coils radiation exposure. Systems for shielding and cooling are other examples.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A magnetic confinement system comprising:
   a) a magnetic mirror device including
      i) a chamber to hold a target plasma;
      ii) a coil arrangement to generate a magnetic field configuration in the chamber to confine the target plasma in cylindrically-symmetric form in the chamber, the magnetic field configuration having open ends, the coil arrangement including plural coils arranged along a length of the chamber to generate a longitudinal magnetic field to confine the target plasma radially, the magnetic field strengthened at the ends of the magnetic field configuration to form magnetic mirrors; and
   b) plasma guns to generate plasma pistons and project the plasma pistons at the open ends of the magnetic field configuration and at the target plasma confined by the magnetic field configuration, the plasma guns arranged to project the plasma pistons along a longitudinal axis of the chamber, the plasma pistons in operation converging towards each other, current through the coils of the coil arrangement in operation being adjusted as the converging plasma pistons enter the chamber, the coils including end coils at ends of the target plasma and central coils between the end coils, wherein the current being adjusted includes relaxing current in the end coils to relax the magnetic mirrors so as to accommodate the converging plasma pistons, and wherein the system is configured to electromagnetically pin the plasma pistons in place at the target plasma, to plug the open ends of the magnetic field configuration and to compress and heat the target plasma.

2. The system of claim 1, wherein the chamber is cylindrical.

3. The system of claim 1, wherein each of the plasma guns is configured to project one of the plasma pistons at one of the open ends of the magnetic field configuration.

4. The system of claim 1, wherein the plasma guns are linear railguns and the chamber is non-cylindrical to accommodate the linear railguns.

5. The system of claim 1, wherein the plasma guns are coaxial railguns.

6. The system of claim 1, wherein each plasma piston comprises a series of plasma pistons.

7. The system of claim 1, wherein each plasma piston comprises primarily a composition different from that of the target plasma.

8. The system of claim 1, wherein each plasma piston comprises primarily thermonuclear fuel.

9. The system of claim 1, further comprising means to hold the plasma pistons in position after compression of the target plasma.

10. The system of claim 1, wherein the target plasma is confined in a field-reversed configuration.

11. The system of claim 1, wherein the target plasma is a spheromak.

12. The system of claim 1, wherein the coil arrangement is configured to modify the magnetic field configuration progressively to maintain compression of, or further compress, the target plasma via the plasma pistons.

13. The system of claim 1, the plasma pistons are electromagnetically pinned in place at the target plasma by reversing current direction in the end coils while maintaining current direction in the central coils to provide cusp magnetic fields to pin the plasma pistons in place at the target plasma.

14. The system of claim 1, wherein the plasma pistons are electromagnetically pinned in place at the target plasma by forcing current through the plasma pistons to provide a Lorentz force to hold the plasma pistons in place at the target plasma.

15. The system of claim 1, further comprising a mechanism to further compress the target plasma radially.

16. The system of claim 15, wherein the mechanism is configured to increase the magnetic field at a center region of the magnetic field configuration to compress the target plasma radially.

17. The system of claim 15, wherein the mechanism includes a liner within the chamber, the liner configured to implode to compress the target plasma radially.

18. The system of claim 1, wherein the target plasma comprises primarily thermonuclear fuel.

19. The system of claim 18, wherein the target plasma further comprises a relatively small amount of heavy ions to cool electrons via bremsstrahlung.

20. The system of claim 1, further comprising a central conductor extending through the chamber between two of the plasma guns to stabilize the plasma pistons.

21. The system of claim 20, wherein the central conductor is configured to further stabilize the plasma pistons, the target plasma, or both, by application of a current through the central conductor.

22. A magnetic confinement system comprising:
   a) a magnetic mirror device including
      i) a chamber to hold a target plasma;
      ii) a coil arrangement to generate a magnetic field configuration in the chamber to confine the target plasma in cylindrically-symmetric form in the chamber, the magnetic field configuration having open ends, the coil arrangement including plural coils arranged along a length of the chamber to generate a longitudinal magnetic field to confine the target plasma radially, the magnetic field strengthened at the ends of the magnetic field configuration to form magnetic mirrors;

b) coaxial railguns to generate plasma pistons and project the plasma pistons along a longitudinal axis of the chamber at the open ends of the magnetic field configuration, the plasma pistons in operation converging towards each other, current through the coils of the coil arrangement in operation being adjusted as the converging plasma pistons enter the chamber, the coils including end coils at ends of the target plasma and central coils between the end coils, wherein the current being adjusted includes relaxing current in the end coils to relax the magnetic mirrors so as to accommodate the converging plasma pistons, and wherein the system is configured to electromagnetically pin the plasma pistons in place at the target plasma, to plug the open ends of the magnetic field configuration and to compress and heat the target plasma;

c) a mechanism to further compress the target plasma radially; and d) a central conductor extending through the chamber between two of the coaxial railguns to stabilize the plasma pistons.

23. The system of claim 22, wherein each of the plasma pistons comprises primarily a composition different from that of the target plasma.

24. The system of claim 22, wherein the mechanism to further compress the target plasma radially includes a liner within the chamber, the liner configured to implode to compress the target plasma radially.

25. The system of claim 22, wherein the central conductor is joined at each end to a central electrode of one of the two coaxial railguns.

26. The system of claim 22, wherein the plasma pistons are electromagnetically pinned in place at the target plasma by reversing current direction in the end coils while maintaining current direction in the central coils to provide cusp magnetic fields to pin the plasma pistons in place at the target plasma.

27. The system of claim 22, wherein the plasma pistons are electromagnetically pinned in place at the target plasma by forcing current through the plasma pistons to provide a Lorentz force to hold the plasma pistons in place at the target plasma.

* * * * *